US011397630B2

(12) United States Patent
Dutta et al.

(10) Patent No.: US 11,397,630 B2
(45) Date of Patent: Jul. 26, 2022

(54) FAULT DETECTION AND CORRECTION OF API ENDPOINTS IN CONTAINER ORCHESTRATION PLATFORMS

(71) Applicant: Kyndryl, Inc., New York, NY (US)

(72) Inventors: Shantanu Dutta, Karnataka (IN); Bijo Sebastian Kappen, Karnataka (IN); Sujith Rajeevakshan Pillai, Karnataka (IN); Raj Kumar Teketi, Hyderabad (IN); Rohit Kshirsagar, Bangalore (IN)

(73) Assignee: KYNDRYL, INC., New York, NY (US)

( * ) Notice: Subject to any disclaimer, the term of this patent is extended or adjusted under 35 U.S.C. 154(b) by 286 days.

(21) Appl. No.: 16/732,515

(22) Filed: Jan. 2, 2020

(65) Prior Publication Data
US 2021/0208961 A1 Jul. 8, 2021

(51) Int. Cl.
*G06F 11/00* (2006.01)
*G06F 11/07* (2006.01)
*G06F 9/54* (2006.01)

(52) U.S. Cl.
CPC ........... *G06F 11/0751* (2013.01); *G06F 9/54* (2013.01); *G06F 11/0721* (2013.01)

(58) Field of Classification Search
CPC ............... G06F 11/0757; G06F 11/076; G06F 11/3433; G06F 11/3442
See application file for complete search history.

(56) References Cited

U.S. PATENT DOCUMENTS

| 8,413,144 | B1 | 4/2013 | Manmohan et al. |
| 8,572,044 | B2 * | 10/2013 | Booz ................... G06F 11/1479 |
| | | | 707/674 |
| 9,983,860 | B1 | 5/2018 | Koty et al. |
| 10,223,109 | B2 | 3/2019 | Lepcha et al. |
| 10,244,034 | B2 | 3/2019 | Joshi et al. |
| 10,255,061 | B2 | 4/2019 | Lander et al. |
| 10,936,717 | B1 * | 3/2021 | Herman Saffar ....... G06F 21/56 |

(Continued)

FOREIGN PATENT DOCUMENTS

| CN | 107870845 A | 4/2018 |
| CN | 110633085 A | 12/2019 |

OTHER PUBLICATIONS

Patent Cooperation Treaty, PCT/IB2020/061620, Mar. 15, 2021.
(Continued)

*Primary Examiner* — Elmira Mehrmanesh
(74) *Attorney, Agent, or Firm* — Ken Han; Andrew M. Calderon; Roberts Calderon Safran & Cole, P.C.

(57) ABSTRACT

A method, system and computer program product for improving the availability of API endpoints in container orchestration platforms. A service request handler module of a microservice application programming interface (API) fault manager (MAFM) invokes a microservice API fault management service in response to detecting an unresponsive microservice managed by a container orchestration platform. An API inspection module of the MAFM identifies an unresponsive API of the unresponsive microservice. A remedial action module of the MAFM determines a remedial action to correct an unresponsive state of the unresponsive API. A container platform interface module of the MAFM communicates the remedial action to the container orchestration platform.

20 Claims, 5 Drawing Sheets

(56) References Cited

U.S. PATENT DOCUMENTS

| | | | |
|---|---|---|---|
| 2014/0304398 A1* | 10/2014 | Carlen | G06F 9/54 |
| | | | 709/224 |
| 2015/0058855 A1* | 2/2015 | Slinger | G06F 11/3423 |
| | | | 718/102 |
| 2016/0212012 A1* | 7/2016 | Young | G06F 9/45558 |
| 2017/0371567 A1* | 12/2017 | Piduri | G06F 3/0665 |
| 2018/0114234 A1* | 4/2018 | Fighel | G06F 40/253 |
| 2018/0288129 A1* | 10/2018 | Joshi | H04L 43/08 |
| 2018/0321918 A1 | 11/2018 | McClory et al. | |
| 2019/0102226 A1 | 4/2019 | Caldato et al. | |
| 2019/0238399 A1 | 8/2019 | Perreira et al. | |
| 2019/0258549 A1* | 8/2019 | Abdul Kadar | G06F 11/1451 |
| 2020/0034178 A1* | 1/2020 | Gupta | G06F 9/45533 |

OTHER PUBLICATIONS

Richardson, Pattern: Circuit Breaker, Microservice Architecture, 2019, https://microservices.io/patterns/reliability/circuit-breaker.html.

\* cited by examiner

FAULT DETECTION AND CORRECTION OF API ENDPOINTS IN CONTAINER ORCHESTRATION PLATFORMS

TECHNICAL FIELD

The present invention relates generally to a method, system, and computer program product for troubleshooting an unresponsive microservice. More particularly, the present invention relates to a method, system, and computer program product for improving the availability of API endpoints in container orchestration platforms.

BACKGROUND

A microservice architecture (MSA) is a variant of a service-oriented architecture (SOA) structural style and is one that arranges an application as a collection of loosely coupled services, commonly referred to as microservices due to their narrow scope in executing smaller tasks. It is common for MSA's to be adopted for cloud-native applications, and applications using lightweight container deployment. A consequence of following an MSA approach is that the individual microservices are independently deployable and can be individually scaled. In a monolithic approach, an application supporting a plurality of functions would have to be scaled in its entirety even if only one of these functions had a resource constraint. With microservices, only the microservice supporting the function with resource constraints would be scaled out.

Because of the large number of services as compared to monolithic application implementations, decentralized continuous delivery and DevOps with holistic service monitoring are used to effectively develop, maintain, and operate such applications. In this regard, container orchestration platforms have been developed for managing complex applications comprised of multiple microservices working together through application programming interfaces (APIs) that are not dependent on a specific code language. While containers and microservices exist independently and serve different purposes, they are often used together. Containers are an enabling technology for microservices, which is why microservices are often delivered in one or more containers. Since containers are isolated environments, containers can be used to deploy microservices quickly, regardless of code language used to create each microservice. When implementing and managing containers and microservices, DevOps teams must actively work to prevent problematic code, such as errant application code and unresponsive APIs.

SUMMARY

Embodiments of the invention are defined by the claims below, not this summary. A high-level overview is provided here to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

The illustrative embodiments provide a method, system, and computer program product. An embodiment includes a method that invokes, using a service request handler module of a microservice application programming interface (API) fault manager (MAFM) a microservice API fault management service, responsive to detecting an unresponsive microservice managed by a container orchestration platform. An embodiment identifies an unresponsive API of the unresponsive microservice using an API inspection module of the MAFM. An embodiment determines, using a remedial action module of the MAFM, a remedial action to correct an unresponsive state of the unresponsive API. An embodiment communicates, using a container platform interface module of the MAFM, the remedial action to the container orchestration platform.

An embodiment includes a computer usable program product. The computer usable program product includes one or more computer-readable storage devices, and program instructions stored on at least one of the one or more computer-readable storage devices.

An embodiment includes a computer system. The computer system includes one or more processors, one or more computer-readable memories, and one or more computer-readable storage devices, and program instructions stored on at least one of the one or more computer-readable storage devices for execution by at least one of the one or more processors via at least one of the one or more computer-readable memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
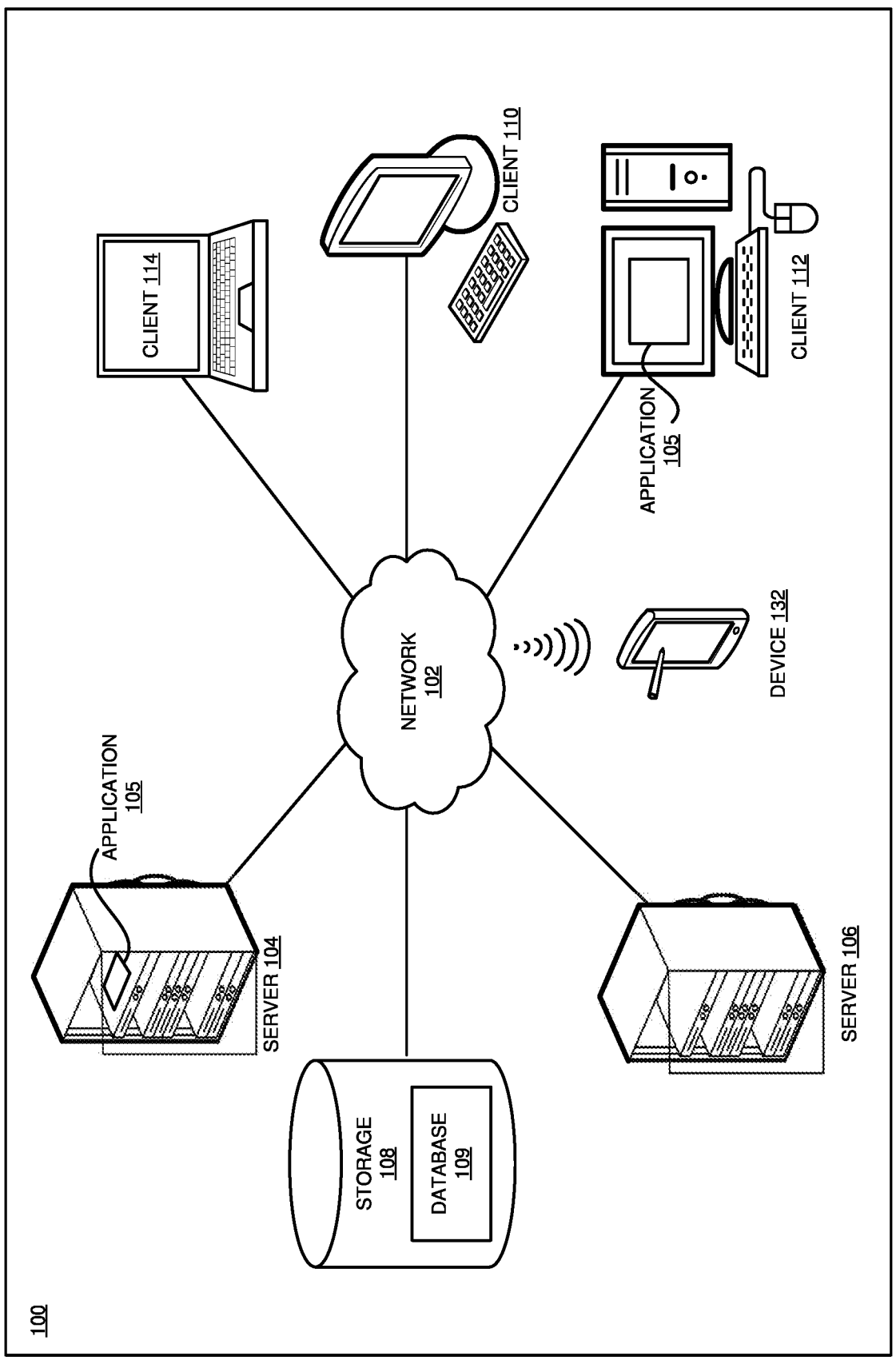
FIG. 1 depicts a block diagram of a network of data processing systems in which illustrative embodiments may be implemented.

The illustrative embodiments recognize that there is a need in a microservice operating environment that is managed by container orchestration platforms to ensure the validity of application programming interfaces (APIs), which are responsible for connecting the data and presentation layers of an application. Because the API layer directly touches both data and presentation layers, it is a key area for continuous testing for quality assurance (QA) and development teams. While there are many aspects of API testing, it generally consists of making requests to a single API endpoint or sometimes multiple API endpoints and validate the response, whether for performance, security, and/or functional correctness.

The illustrative embodiments further recognize that container orchestration platforms, such as KUBERNETES and DOCKER, when implemented to manage complex application environments having a large number of microservices, generally only provide capabilities to monitor and scale pods (i.e., individual microservices) in the event that there is a failure within a container associated with a plurality of microservices. Current container orchestration platform technologies are not designed to validate and take any remedial action(s) based on problems related to the actual application logic and the APIs running within the failing container. As a result, current container orchestration platforms may simply remedy a failing container by replacing it with a newly spawned container, which is identical in the number and organization of microservices and their supporting APIs when compared to the contents of the failed container. In this regard, current container orchestration platforms may mistakenly treat the newly spawned container as a healed container, when in reality one or more of the supporting APIs are unresponsive and the API's failed state remains undetectable to current container orchestration platforms. This causes the application as a whole to become unresponsive.

The illustrative embodiments also recognize that traditional third-party tools for monolithic applications, which provide fault tolerant and high availability solutions, are ineffective in microservice-based environments because of their inability to perform API validation and healing. Moreover, illustrative embodiments recognize that other solutions for monolithic environments, such as network devices and API gateways providing continuous API monitoring, carry the cost of performance degradation. Even other solutions designed for microservice-based environments fail to perform API validation and healing. Further, illustrative embodiments recognize that current microservice-based implementations employ application logics to perform checks on error codes and perform remedial actions based on the type of error code. However, even if a container orchestration platform terminates a pod and spawns another pod, such actions still do not guarantee individual API validation and healing.

The illustrative embodiments recognize that the presently available solutions do not address these needs or provide adequate solutions for these needs. The illustrative embodiments used to describe the invention generally address and solve the above-described problems and other problems related to improving the availability of API endpoints under the management of container orchestration platforms in a microservice operating environment.

An embodiment can be implemented as a software application. The application implementing an embodiment can be configured as a modification of an existing API gateway, a modification of an existing container orchestrator platform, as a separate application that operates in conjunction with an existing API gateway, as a separate application that operates in conjunction with an existing container orchestrator platform, a standalone application, or some combination thereof. Particularly, some illustrative embodiments provide a method that facilitates improving the availability of API endpoints under the management of container orchestration platforms in a microservice operating environment.

An embodiment configures a microservice application programming interface fault manager (MAFM) to identify an unresponsive API and to determine a remedial action. According to one embodiment, the MAFM operations are triggered by a fault that is detected and communicated to a service request handler of the MAFM by third party monitoring tools, such as PROMETHEUS and GRAFANA. In other embodiments, the MAFM operations are triggered by a fault that is detected and communicated to the MAFM by an API gateway that is unable to gain a response from a requested API. In this regard, the fault detected by the API gateway appears to originate at a requested API, but it is not conclusive to be the actual source of the fault, as the requested API may itself depend upon other nested APIs.

Another embodiment configures an API inspection module of the MAFM to identify the particular, unresponsive API(s). According to one embodiment, the API inspection module inspects APIs that that have been predetermined by the application developer to be critical to the operation of the microservice. The API inspection module then runs one or more sample input data requests through API gateway to test and pinpoint the immediate API source of the fault. According to another embodiment, after detecting the unresponsive API, a remedial action module of the MAFM is configured to determine an appropriate remedial action. According to one embodiment, the remedial action module inputs the identified, unresponsive API into a machine-learning model and determines a remedial action outcome. According to one embodiment, the remedial action includes terminating a container of the microservice associated with the unresponsive API and launching a new container of the microservice. According to another embodiment, the remedial action is rescaling a number of containers. Each container is associated with a microservice employing at least one API.

According to one embodiment, the remedial action decision is communicated to a container platform interface module of the MAFM. The container platform interface, in turn, interfaces with a container orchestration platform (e.g., KUBERNETES, DOCKER), which performs the actual remedial action by leveraging its native APIs. According to another embodiment, a monitoring scheduler module of the MAFM monitors a validity of the state of the API identified as unresponsive. The monitoring scheduler inputs test inputs to determine whether the once faulty API has been repaired by the remedial action. According to another embodiment, the monitoring process continues after a predetermined period of time. According to another embodiment, the monitoring process continues after a predetermined number of successful responses to API requests. If any fault continues to be detected, the negative outcome is reported and stored in an API monitoring database as a source for historical outcome information. The historical outcome information, whether indicating a successful or unsuccessful outcome, is fed to the machine learning algorithm of the remedial action module and assists in further refinements to the remedial action determination model.

In view of the foregoing embodiments, the availability of API endpoints in container orchestration platforms is improved within a microservices environment. The examples described herein of improving the availability of API endpoints in a microservices environment that employs a container orchestration platform are not meant to be limiting in any way. From this disclosure, those of ordinary skill in the art will be able to conceive many other ways of implementing the above enhancement. and the same are contemplated within the scope of the illustrative embodiments.

The manner of repairing faulty APIs within a microservices environment that employs a container orchestration platform, as described herein, is unavailable in the presently available methods in the technological field of endeavor pertaining to API monitoring and fault remediation in microservice environments. A method of an embodiment described herein, when implemented to execute on a device or data processing system, comprises substantial advancement of the functionality of that device or data processing system by providing a centralized, MAFM that works in cooperation with an existing API gateway and container orchestration platforms.

The illustrative embodiments are described with respect to certain types of processing elements, API gateways, container orchestration platforms, third-party monitoring tools, API inspection tools, machine learning tools, debugger programs, computer memories, storage devices, containers, cloud computing systems, virtual computing systems, operating systems, computing systems, server systems, data processing systems, networked computing environments, devices, other environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data instruction, data source, instruction source, access to a data source over a data network, or access to an instruction source over a data network. Any type of storage device may provide the data or instruction to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable computing devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
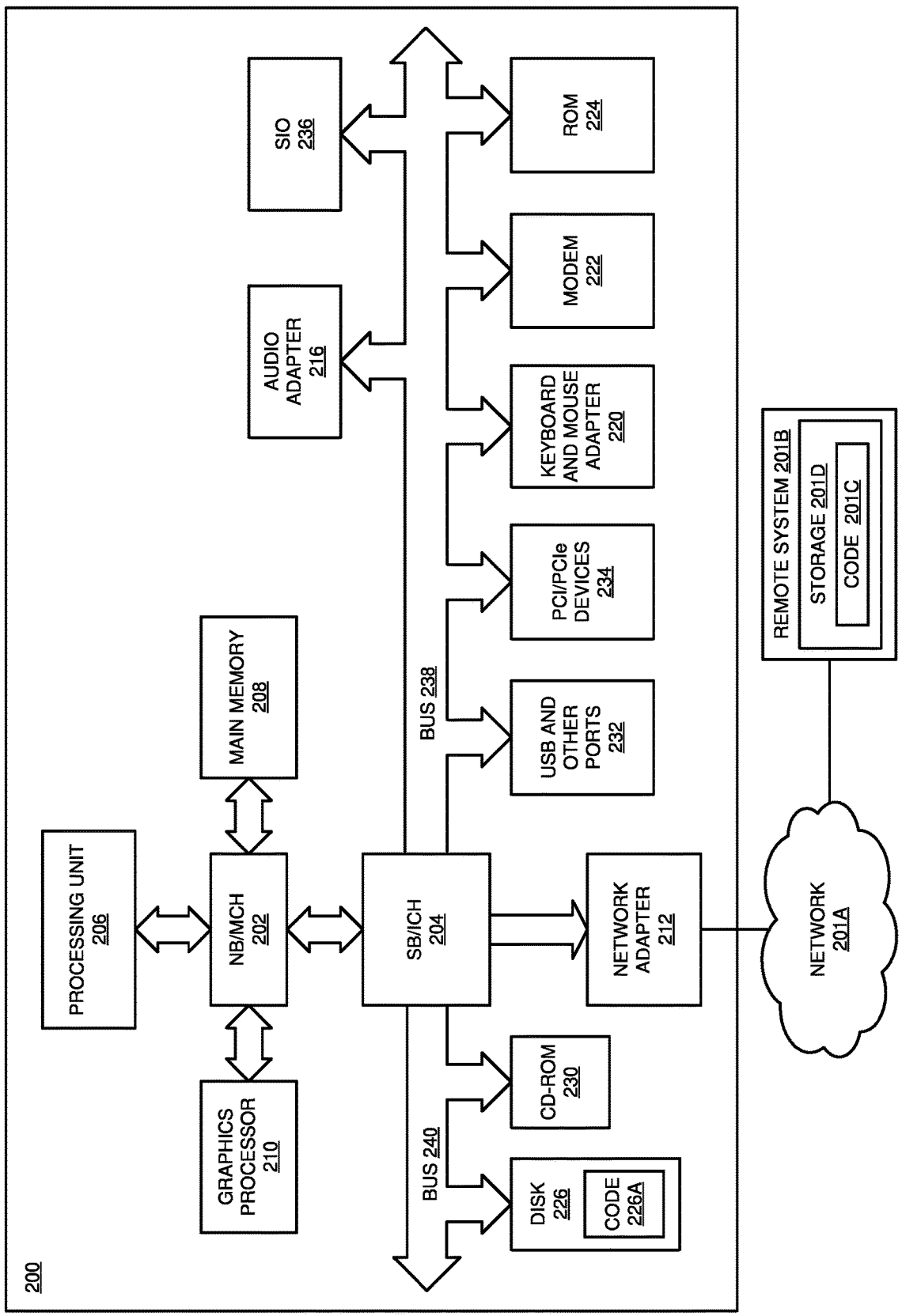
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment is distributed across several data processing systems and a data network as shown, whereas another embodiment is implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 on a server-side implements an embodiment described herein. According to one embodiment, the application 105 maintains a microservice application programming interface (API) fault manager (MAFM). In other embodiments described herein, application 105 is implemented on a client-side (e.g., in clients 110-114, and device 132). Further description of the MAFM is disclosed herein with reference to FIGS. 3-5 below.

A database 109, such as a database for tracking historical outcomes of a remedial action taken in response to an API fault, may be stored in storage 108 as shown or supplied by another source (not shown). Application 105 can also execute in any of data processing systems 104, 106, 110, 112, and 114. Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, containers, and services) that can be rapidly provisioned and released with minimal management effort or interaction with a provider of the content or service.

With reference to FIG. 2, this figure depicts a block diagram of a data processing system 200 in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as client-side application 113 or server-side application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
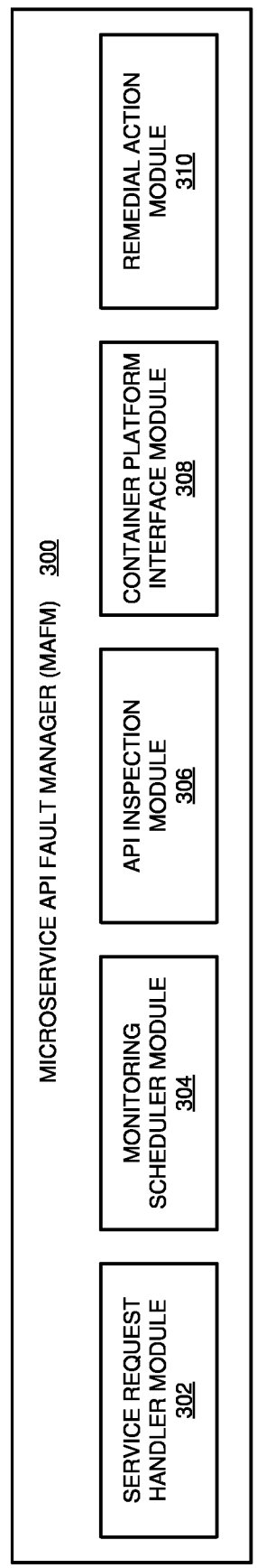
FIG. 3 depicts a block diagram of a microservice API fault manager (MAFM) in which illustrative embodiments may be implemented.

With reference to FIG. 3, an example is shown of a microservice API fault manager (MAFM) 300 configured to identify an unresponsive API and to determine a remedial action, according to one embodiment of the invention. As shown, the MAFM 300 includes a service request handler module 302, a monitoring scheduler module 304, an API inspection module 306, a container platform interface module 308, and a remedial action module 310.

According to an embodiment, service request handler module 302 invokes, using a service request handler module of a microservice application programming interface (API) fault manager (MAFM), a microservice API fault management service. According to one embodiment, the MAFM 300 operations are triggered by a fault that is detected and communicated to service request handler 302 of the MAFM 300 by third party monitoring tools (not shown), such as PROMETHEUS and GRAFANA. In other embodiments, the MAFM 300 operations are triggered by a fault that is detected and communicated to the MAFM 300 by an API gateway (404, shown in FIG. 4) that is unable to gain a response from a requested API. In this regard, each API request is transmitted via the API gateway and each API that is requested is associated with a particular address. In this regard, it is important to appreciate that although a fault detected by the API gateway 404 appears to originate at a requested API, such a detection is not necessarily conclusive that the requested API is the underlying source of the fault. According to one example embodiment, the requested API itself depends upon other API(s), whose unresponsiveness causes the requested API to also be unresponsive.

According to an embodiment, API inspection module 306 inspects APIs that that have been predetermined by the application developer to be critical to the operation of the microservice. In one example embodiment, the API inspection module 306 runs one or more sample input data requests through API gateway 404 to test and pinpoint the immediate API source of the fault. According to one embodiment, the sample input data requests are drawn from historical API requests that are previously stored in a database for machine learning and monitoring.

According to an embodiment, remedial action module 310 of the MAFM is configured to determine an appropriate remedial action. According to one embodiment, the remedial action module 310 inputs the identified, unresponsive API into a machine-learning model and determines a remedial action outcome. The machine-learning model is updated based on historical data accumulated over the execution lifetime of the application.

Figure 4:
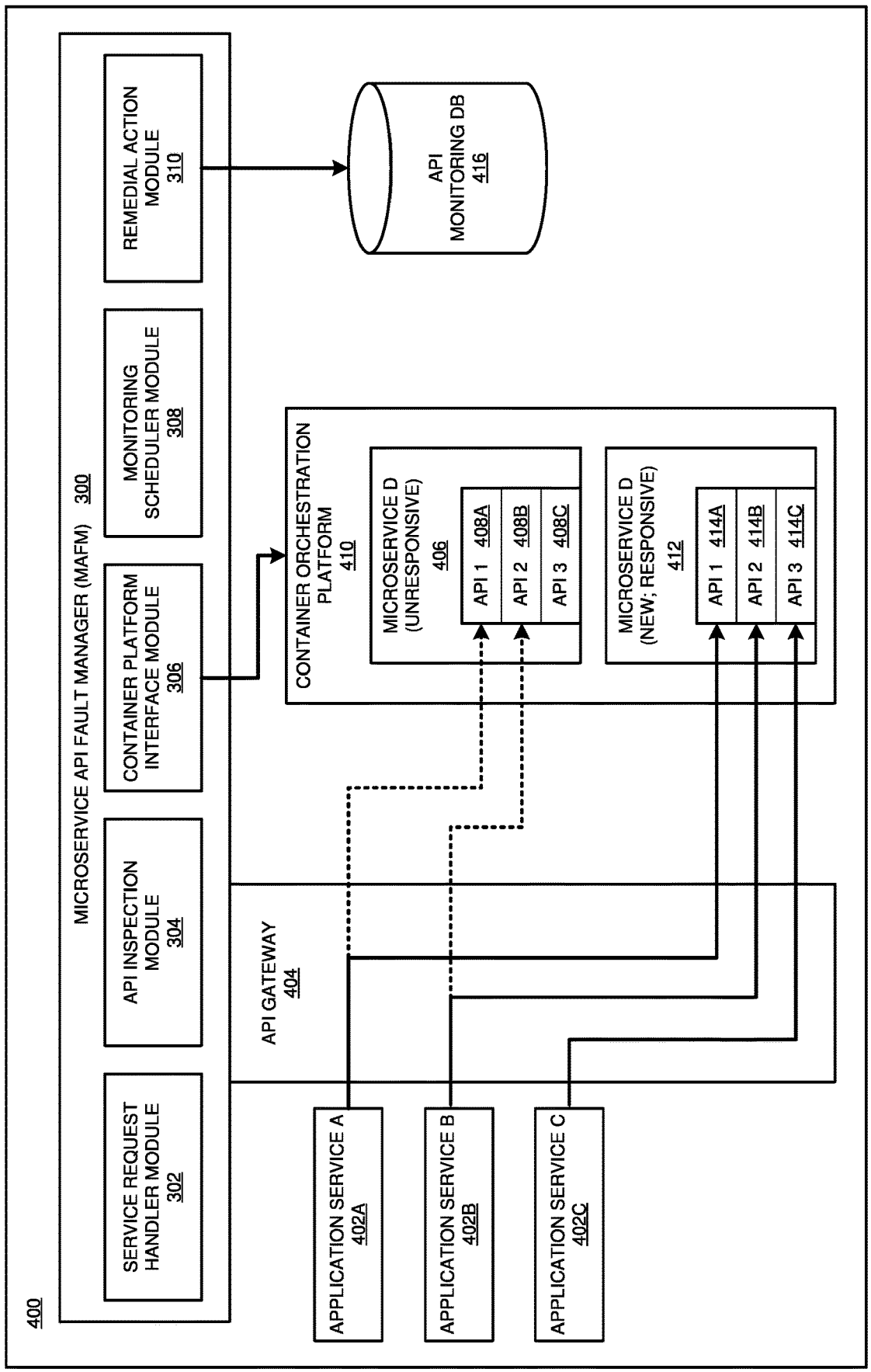
FIG. 4 depicts a block diagram of a microservice operating environment incorporating the MAFM and container orchestration platform in which illustrative embodiments may be implemented.

According to an embodiment, container platform interface module 308 serves as an interface with container orchestration platform (410 in FIG. 4). Container orchestration platform is responsible for executing the determined remedial action by leveraging its own native APIs.

According to an embodiment, a monitoring scheduler module 304 monitors a validity state of the API identified as unresponsive. The monitoring scheduler module 304 inputs test inputs to determine whether the once faulty API has indeed been repaired by the remedial action.

With reference to FIG. 4, a block diagram of a microservice operating environment 400 incorporating the MAFM 300 and its interoperability with container orchestration platform 410 and API gateway 404 is shown, according to one embodiment of the invention. In the example embodiment shown, three distinct application services: service A, B, C 403a-c respectively send service requests through API gateway 404. The API gateway 404 handles these requests for particular APIs that are needed to successfully execute each discrete microservice that work together to execute the complex application. For example, application service A 402a requires microservice D 406 for successful execution. In particular, application service A 402a requires access to API 1 408a, which for purposes of this example is successfully accessed. However, continuing with the above example embodiment, application service B 402b also requires microservice D 406 and in particular requires access to API 2 408b. In this example embodiment, however, application service B 402b is unable to access API 2 408b and its microservice request times out. In this regard, API gateway 404 is responsible for handling the microservice request and is responsible for alerting MAFM 300 of the unresponsive event. In particular, the alert is communicated to service request handler 302, which invokes the microservice API fault management service. Service request handler 302 initiates API inspection module 306, which inspects APIs that that have been predetermined by the application developer to be critical to the operation of the unresponsive microservice D 406. In the example embodiment, API inspection module 306 identifies that both API 2 408b and API 3 408c are unresponsive.

Once API inspection module 306 has identified the API responsible for the microservice's failure, API inspection module 306 initiates the services of remedial action module 310. In the example embodiment shown, remedial action module 310 is configured to determine an appropriate remedial action to heal the unresponsive state of the unresponsive API 2 408b and API3 408c. According to one embodiment, the remedial action module inputs the identified, unresponsive APIs 408b-c into a machine-learning model and determines a remedial action outcome. According to the example embodiment, the remedial action includes terminating the container of the unresponsive microservice D 406 associated with the unresponsive APIs and launching a new container of the microservice, e.g., new microservice D 412, having newly spawned APIs 1-3 414*a-c*.

The remedial action decision is communicated to container platform interface module 308. Container platform interface module 308 interfaces with container orchestration platform 410, which performs the remedial action by leveraging its native APIs. However, it should be appreciated that the remedial action may not resolve the unresponsiveness of the microservice. For this reason, monitoring scheduler module 304 monitors a validity of the state of the new APIs that were previously identified in microservice D 406 as unresponsive. Monitoring scheduler module 304 invokes test cases as inputs to determine whether the once faulty APIs 2 and 3 408*b-c* have been repaired by the remedial action of respawning microservice D 412 and creating APIs 2 and 3 414*b-c*. According to one embodiment, the monitoring process continues after a predetermined period of time. According to another embodiment, the monitoring process continues after a predetermined number of successful responses to API requests, indicative of a stable API. If any fault continues to be detected, the negative outcome is reported and stored in an API monitoring database 416 as a source for historical outcome information. The historical outcome information, whether indicating a successful or unsuccessful outcome, is supplied to the machine learning algorithm of the remedial action module 310 and assists in further refinements to the remedial action determination model. According to the example embodiment, having terminated the previous container of microservice D 406 and spawning a working microservice D 412, application service C 402*c* is shown to request microservice D 412 and in particular require access to API 3 414*c*. In this example embodiment, application service C 402*c* is able to access API 3 414*c*, whose now terminated predecessor API 3 408*c* would have not been accessible.

Figure 5:
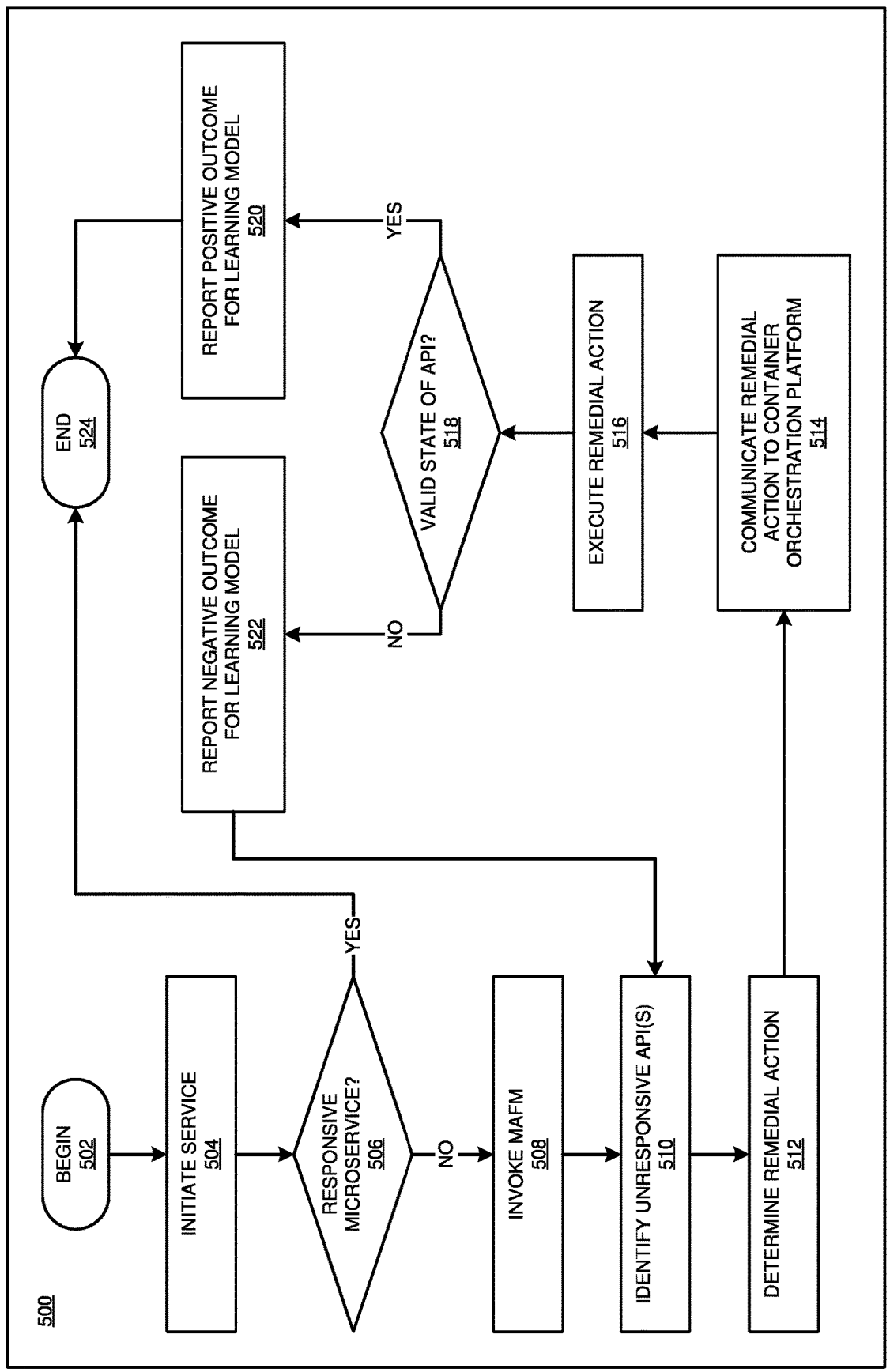
FIG. 5 depicts a flowchart of a process for API fault detection and remediation in a microservice operating environment, in accordance with an illustrative embodiment.

With reference to FIG. 5, this figure depicts a flowchart of an example process 500 for API fault detection and remediation in a microservice operating environment as described in FIG. 4. The process begins at block 502 and proceeds to block 504, where an application service is initiated (e.g., application service A-C 402*a-c*), which includes the requesting of one or more microservices (e.g., microservice D 410) via API gateway 404. From block 504, the process continues to decision block 506, where it is determined by API gateway 404 whether the requested microservice is responsive to the request. If the microservice is responsive, the process terminates at block 524. However, if it is determined that the requested microservice is unresponsive, the process continues to block 508, where API gateway 404 alerts service request handler 302, which invokes the microservice API fault management service. From block 508, the process continues to block 510, where API inspection module 306 identifies the unresponsive API(s). After identifying the unresponsive API(s), the process continues to block 512, where remedial action module 310 determines a remedial action to correct the unresponsive state of the API(s) (e.g., APIs 2 and 3; 408*b-c*). The process continues to block 514, where container platform interface module 308 communicates the remedial action (e.g., spawn new microservice/container D 412) to container orchestration platform 410, which then executes the remedial action using its native APIs (block 516). From block 516, the process continues to decision block 518, where monitoring scheduler module 304 verifies whether the remedial action has resulted in a valid state for the requested API (e.g., newly spawned APIs 2 and 3; 414*b-c*). If a valid state is determined, the process flows to block 520, where monitoring scheduler module 304 reports the positive outcome to API monitoring database 416. The API monitoring database 416 stores the historical outcome data and is in communication with remedial action module 310, which accesses the outcome data to further refine the remedial action determination model. From block 520, the process ends at block 524. However, if an invalid state of the API is determined in decision block 518, the process continues to block 522, where monitoring scheduler module 304 reports the negative outcome to API monitoring database 416. The API monitoring database 416 stores the historical outcome data and is in communication with remedial action module 310, which accesses the outcome data to further refine the remedial action determination model. From block 522, the process loops back to block 510, where API inspection module 306 seeks again to identify the source of the unresponsiveness.

Thus, a computer implemented method, system or apparatus, and computer program product are provided in the illustrative embodiments for improving the availability of API endpoints in container orchestration platforms. and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, such as a computer-readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    invoking, responsive to detecting an unresponsive microservice managed by a container orchestration platform, a microservice Application Programming Interface (API) fault management service;
    identifying, by directing a test data request to a plurality of APIs, the plurality of APIs predetermined to be critical to an operation of the unresponsive microservice, an unresponsive API, the unresponsive API causing unresponsiveness of the unresponsive microservice;
    determining a remedial action to correct an unresponsive state of the unresponsive API; and
    communicating the remedial action to the container orchestration platform;
    wherein the invoking, identifying, determining and communicating is executed by a microservice API fault manager (MAFM).

2. The method of claim 1, further comprising:
    monitoring, by the MAFM, responsive to executing the remedial action, a validity of the state of the unresponsive API.

3. The method of claim 2, wherein the monitoring is for a predetermined time period starting from detection of a valid state of the unresponsive API.

4. The method of claim 1, further comprising:
storing, by the MAFM, an outcome of the remedial action.

5. The method of claim 1, wherein the determining a remedial action employs a machine-learning algorithm that modifies a remedial action determination based on historical outcome information.

6. The method of claim 1, wherein the remedial action includes terminating a container of a microservice associated with the unresponsive API and launching a new container of the microservice.

7. The method of claim 1, wherein the remedial action includes rescaling a number of containers, wherein each container is associated with a microservice employing at least one API.

8. The method of claim 1, wherein the invoking is triggered by detecting an unresponsive state of the unresponsive microservice.

9. The method of claim 1, wherein the invoking is triggered when a latency in accessing the unresponsive microservice exceeds a predetermined time threshold.

10. The method of claim 1, wherein the invoking is triggered when a microservice becomes unresponsive after serving a predetermined number of microservice requests.

11. The method of claim 1, wherein at least one native API of the container orchestration platform performs the remedial action.

12. A computer system, the computer system comprising one or more processors, one or more computer-readable memories, and one or more computer-readable storage devices, and program instructions stored on at least one of the one or more computer-readable storage devices for execution by at least one of the one or more processors via at least one of the one or more computer-readable memories, the stored program instructions comprising:
program instructions to invoke using a microservice application programming interface (API) fault manager (MAFM) responsive to detecting an unresponsive microservice managed by a container orchestration platform, a microservice Application Programming Interface (API) fault management service;
program instructions to identify, using the MAFM, by directing a test data request to a plurality of APIs, the plurality of APIs predetermined to be critical to an operation of the unresponsive microservice, an unresponsive API, the unresponsive API causing unresponsiveness of the unresponsive microservice;
program instructions to determine, using the MAFM, a remedial action to correct an unresponsive state of the unresponsive API; and
program instructions to communicate, using the MAFM, the remedial action to the container orchestration platform.

13. The computer system of claim 12, further comprising:
program instructions to monitor using the MAFM, responsive to executing the remedial action, a validity of the state of the unresponsive API.

14. The computer system of claim 13, wherein the program instructions to monitor is for a predetermined time period starting from detection of a valid state of the unresponsive API.

15. The computer system of claim 12, further comprising:
program instructions to store an outcome of the remedial action to the MAFM.

16. The computer system of claim 12, wherein the MAFM employs a machine-learning algorithm that modifies a remedial action determination based on historical outcome information.

17. The computer system of claim 12, wherein at least one native API of the container orchestration platform performs the remedial action.

18. A computer program product comprising one or more computer-readable storage devices, and program instructions stored on at least one of the one or more computer-readable storage devices, the stored program instructions comprising:
program instructions to invoke using a microservice application programming interface (API) fault manager (MAFM) responsive to detecting an unresponsive microservice managed by a container orchestration platform, a microservice Application Programming Interface (API) fault management service;
program instructions to identify, using the MAFM, by directing a test data request to a plurality of APIs, the plurality of APIs predetermined to be critical to an operation of the unresponsive microservice, an unresponsive API, the unresponsive API causing unresponsiveness of the unresponsive microservice;
program instructions to determine, using the MAFM, a remedial action to correct an unresponsive state of the unresponsive API; and
program instructions to communicate, using the MAFM, the remedial action to the container orchestration platform.

19. The computer program product of claim 18, the stored program instructions further comprising:
program instructions to monitor using the MAFM, responsive to executing the remedial action, a validity of the state of the unresponsive API.

20. The computer program product of claim 19, wherein the program instructions to monitor is for a predetermined time period starting from detection of a valid state of the unresponsive API.

* * * * *